United States Patent Office 3,687,684
Patented Aug. 29, 1972

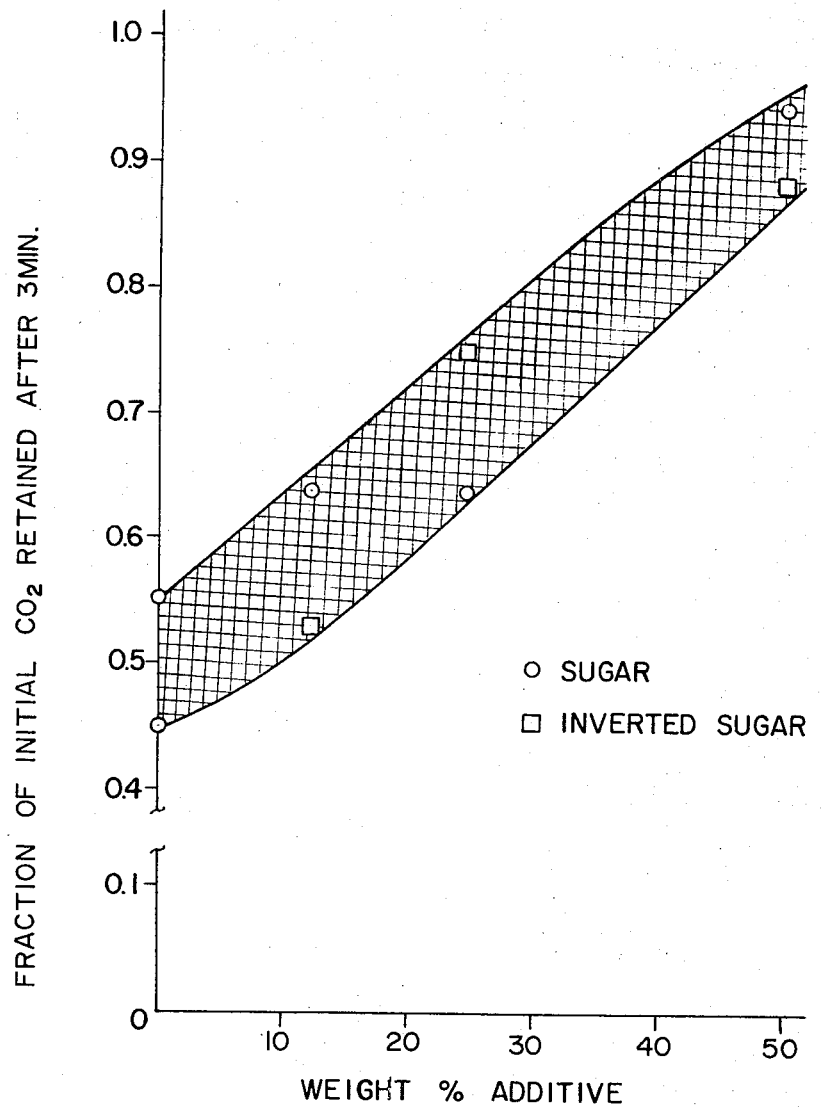

3,687,684
METHOD OF MAKING CARBONATED BEVERAGES
Ralph L. Wentworth, Watertown, and Glenn K. Armstrong, Lexington, Mass., assignors to Dynatech Corporation, Cambridge, Mass.
Filed Aug. 21, 1968, Ser. No. 754,222
Int. Cl. A23l 1/00
U.S. Cl. 99—79
4 Claims

ABSTRACT OF THE DISCLOSURE

A carbonated beverage is formed by diluting a concentrated carbonated solution containing 15–75% by weight sugar, 85–25% by weight water, and more than 6 volumes of carbon dioxide. A flavoring agent may be included within the concentrate. The concentrate is diluted by pouring it through air into water without jet assistance or by pouring water through air into the concentrate.

BACKGROUND OF THE INVENTION (a) Field of the invention

The present invention relates to concentrated carbonated liquids. More particularly, it relates to a carbonated beverage concentrate.

(b) Prior art

The market for carbonated beverages has increased at a dramatic rate over the past twenty years. It is estimated that this market now is in the order of four billion dollars annually. Up to the present, this market has been served almost exclusively by beverages which are precarbonated to the proper level for immediate consumption and then packaged in bottles or cans. While carbonation of beverages at the point of consumption, such as at soda fountains, has been practiced for years, presparation of carbonated beverages in the home has not been greeted with wide acceptance.

Homemade carbonated beverages approximating the taste and quality of commercially-bottled beverages have long been sought. This, of course, is possible by adding commercially-bottled carbonated water to a syrup, but such a solution is probably more costly than purchasing a commercially-bottled beverage. Another approach has been the use of yeast and invert sugar in home-bottled drinks. The yeast, of course, causes fermentation of the sugar and subsequent evolution of carbon dioxide, and this reaction carbonates the drink. A principal disadvantage of this approach is that a sludge forms in the bottom of the bottle which will cloud the beverage if it is agitated. Such a residue has an unpleasing taste and appearance. Also, it takes days or weeks for completion of the reaction, depending upon the temperature.

Yet another solution of the problem of making carbonated beverages in the home involves the use of dry mixes containing flavors and sugars along with a gas generation system such as sodium bicarbonate and citric acid. This type of drink, however, has two significant disadvantages. First, there is the undesirable flavor of the soluble salt reaction product, such as sodium citrate, if sodium bicarbonate and citric acid are used to generate the gas. Secondly, there is the disadvantage that the dry mix reacts very quickly and the "fizzing" is finished before the drink is fully consumed. Also, because the drink is mixed at atmospheric pressure, it never contains more than one atmosphere of carbon dioxide. Finally, like the yeast carbonation method, these mixes may also leave residues in the beverage.

Although bottled and canned carbonated beverages have the greatest consumer appeal, even more dramatic growth in this market is possible if the cost of such beverages can be reduced. By far the largest part of the cost of bringing such beverages to the consumer lies in their packaging and distribution. To obtain a significant reduction in the consumer cost of the beverage, therefore, the volume or weight of the container and its contents must be reduced. Since the beverage contains a very high percentage of water, a reduction in the container size can best be accomplished by concentrating the beverage, that is by reducing its water content. Such a beverage may then be diluted by the consumer with water to bring it down to the proper concentration which makes it convenient to store and mix in the home. Concentrating the beverage is also of value in beverage vending machines that mix the beverage during the dispensing operation if syrup or gas storage containers could be made smaller. One of the early teachings of a dilution approach is found in U.S. Pat. No. 436,782, Henry, who suggests carbonating a root beer syrup and diluting it with carbonated water. This approach, however, suffers from the cost and inconvenience of having to maintain a supply of carbonated water to render the concentrate suitable for consumption.

Millar in U.S. Pat. No. 1,006,773 describes the manufacture of a carbonated beverage by mixing carbon dioxide and syrup in one vessel and then passing it into a second vessel containing plain water. This process, however, does not lend itself readily to mixing a beverage in the home, nor does the equipment required to carry on the process lend itself to conventional bottling and distribution techniques except possibly for use in vending machines. The system described operates at very high pressures. Moreover, the final product is not distributed in concentrated form.

An article entitled "What Is Satisfactory Carbonation?" a summary of a talk by John M. Sharf, formerly technical service director of American Bottlers of Carbonated Beverages, points out the difficulty of bottling and distributing carbonated water containing more than 4.5 volumes of carbon dioxide. This summary is distributed by The Technical Service Department of the American Bottlers of Carbonated Beverages in Washington, D.C. The article points out that few carbonated waters are of a type that can hold a solution more than 4.5 volumes of gas and that very few flavored beverages used for mixing purposes behave well with gas contents as high as those which are attainable in carbonated water alone. Moreover, Insalata in "Averting Beverage 'Gushing'" (Food Engineering, April 1957) points out that soft drinks and beer are prone to "wildness" when they are highly carbonated and that soft drinks are even more prone to "wildness" than beer. He says that causes of wildness are (1) presence of nuclei, (2) too much air in the beverage, (3) excessive agitation, and (4) improper storage. According to the nucleole theory, particles in the beverage act as nuclei initiating almost instantaneous gushing when the bottles are opened.

It is, therefore, an object of the present invention to provide a highly carbonated beverage concentrate which may be diluted with water alone to provide a pleasing carbonated beverage.

Another object of this invention is to provide a highly carbonated beverage concentrate which will retain its carbonation and not gush out of the container when the container is opened.

A further object of the invention is to minimize the costs of containers for carbonated beverages through distribution of a reduced volume of material more convenient to transport and store.

Still another object of the invention is to furnish the consumer with the means to prepare a carbonated beverage of the level of flavor and carbonation suited to his taste.

An additional object of the invention is to provide a carbonated beverage concentrate that will minimize the gas or liquid storage requirements of a carbonated beverage dispensing unit.

SUMMARY OF THE INVENTION

Our beverage concentrate is an aqueous solution containing a high sugar concentration, other flavoring agents when desired, and more than 4.5 volumes (generally more than 6 volumes) of carbon dioxide. This solution may be blottled or canned to provide a marketable product. The user then dilutes it with water to provide the proper ultimate concentration for consumption of the beverage. For example, it can be marketed in a concentration requiring 1–1 dilution with water. The concentrated beverage will not gush out of the container when the container is opened, nor will it exhibit "wildness" when diluted with water. That is, it is sufficiently quiescent that the proportion of carbonation lost in the process of opening the container, pouring the contents, and mixing with water is minimal. The diluted drink so prepared for consumption accordingly contains a level of carbonation as high as that encountered and expected in ordinary carbonated beverages packed for direct consumption. The description of a carbonated beverage in terms of the "volumes" of carbon dioxide contained is understood by those in the carbonated beverage industry to refer to the volume of carbon dioxide, measured at one atmosphere pressure and 60° F., dissolved in one volume of the liquid beverage. Thus, conventional carbonated beverages will be found to contain approximately two to four volumes of carbon dioxide, depending on the flavor. For example, ginger ales are generally carbonated to 4 volumes, whereas, fruit flavored beverages such as orange soda generally are carbonated to 2 volumes. It will be appreciated that a portion of a concentrate of our invention, if prepared to contain 9 volumes of carbon dioxide or more, and diluted with two portions of water, will furnish a beverage containing 3 volumes of carbon dioxide or more.

BRIEF DESCRIPTION OF THE DRAWING

For a fuller understanding of the nature and objects of the invention, reference should be had to the following detailed description taken in connection with the drawing which is a graph illustrating the variation in short term carbon dioxide retention as a function of the weight percent of sugar in the beverage concentrate.

DESCRIPTION OF THE PREFERRED EMBODIMENTS

Basically, our carbonated beverage concentrate includes a syrup base, such as a commercial soda fountain syrup or water containing a high percentage of sugar and carbon dioxide. We have discovered that quite unexpectedly syrups containing relatively high sugar concentrations can be carbonated to extremely high levels. For example, with a 50% (weight) sugar concentration 11 volumes of gas per volume of liquid can be bottled, and the syrup will be quiescent when uncapped. Indeed, when such concentrates are diluted, the beverage thus prepared is so retentive of carbonation that only 30% of the original carbonation is lost. The carbonation retained in the beverage is sufficient to endow it with the taste and carbonation level typical of commercially-bottled drinks.

The ratio of sugar to water in the concentrate may range from 15% to 75% by weight. Generally, the ratio will be at least 20% to provide a beverage having customary sweetness.

The following are examples of our beverage concentrate.

Example I

We mixed 66 ml. of cola fountain syrup with 54 ml. of water to provide a sugar concentration of roughly 35%. The mixture was then carbonated to 9.7 volumes. The carbonation was accomplished by bubbling carbon dioxide gas through the syrup and water mixture in a 4 oz. glass bottle enclosed within a metal vessel capable of withstanding elevated pressures. Suitable tubes and valves were arranged to conduct the carbon dioxide into the out of the metal vessel. The pressure within the vessel was regulated to 190 pounds per square inch absolute. The vessel was immersed in ice water during the period during which carbon dioxide was being dissolved. After carbonation the bottle was capped. The resulting product was quiescent when uncapped and was diluted with 240 ml. of water to make a beverage which, after pouring 120 ml. concentrate into 240 ml. water, contained 3.2 volumes of carbon dioxide in the final 360 ml. drink. The volumes contained in the concentrate and the drink were determind by forcing the dissolved carbon dioxide from the liquid by heating and measuring the evolved carbon dioxide in a gasometer.

Example II

We mixed 52.5 ml. of commercial orange concentrate and 52.5 ml. of water to provide a sugar concentration of approximately 40%. We then carbonated the mixture to 8.8 volumes with the method of Example I. The resulting beverage was extremely quiescent after uncapping and the poured with agitation into 140 ml. of water to give a beverage containing 2.9 volumes of carbon dioxide in the final 245 ml. drink.

Sucrose and invert sugar (a mixture of equal parts of glucose and fructose obtained by hydrolysis of sucrose) both reduce the carbon dioxide evolution rates in the concentrate. Other carbohydrates (sugars and polysaccharides) believed to have the same effect are maltose, galactose, dextrose, lactose, levulose, honey, malt syrup, corn syrup, wheat syrup, starch and dextrin. Viscosity-inducing agents such as carboxymethyl cellulose do not seem to provide the same carbon dioxide evolution suppression in a concentrate as do the sugars. Similar definciencies have been noted with such glycols as sorbitol and glycerine.

To demonstrate the carbon dioxide retentiveness of concentrated polysaccharide solutions in the face of dissociating influences, we made quantitative measurements of the rate of carbon dioxide evolution from such solutions. A porous ceramic article, commonly known as a "boiling stone" was used as a standard nucleating agent to promote the disengagement of dissolved carbon dioxide from the solutions at room temperature. The stone was placed in the solution and the gas evolved measured in a gasometer as a function of time.

The results of these tests are shown in the drawing, which illustrates the retained carbon dioxide in the concentrate as a function of the sugar concentration, three minutes after immersion of the boiling stone. Similar measurements of carbon dioxide retention one minute and ten minutes after the addition of the boiling stone indicated a corresponding relationship of retained gas to sugar content. From this, it is evident that the amount of carbon dioxide retained in solution over a period of, for example, one to six minutes, increases fairly linearly with the amount of sugar present. This contrasts sharply with the prior belief that highly carbonated beverages are not quiescent.

From the foregoing description it is clear that our concentrate differs materially from existing products. First, it enables the preparation of a concentrate which can contain as much as 11 or more volumes of carbon dioxide without serious danger of gushing on opening. Secondly, it is useful with most commercially-available sugar-based syrups and may be diluted with water to provide a beverage identical in tests with commercially-bottled beverages. Finally, when it is used in the home, it does not go wild when diluted with water.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A method of making a carbonated beverage comprising the steps of:
   (A) placing in a container a concentrated carbonated liquid solution capable of being diluted with a specific proportion of water to form a carbonated beverage, said liquid consisting essentially of:
      (1) 15–75 weight percent of a sugar;
      (2) 85–25 weight percent water;
      (3) more than 6 volumes of carbon dioxide, and,
      (4) optionally, a flavoring agent; and
   (B) diluting said concentrated carbonated liquid by pouring one of said concentrated liquid solution or water through air under atmospheric pressure into the other of said concentrated liquid solution or water, said pouring when of a concentrate into water being without jet assistance.

2. A process as defined in claim 1 wherein the sugar content is 25–60%, the water content 75–40% and the carbon dioxide content 6–11 volumes.

3. A process as defined in claim 1 wherein the sugar is sucrose.

4. A process as defined in claim 2 wherein the sugar is invert sugar.

References Cited

UNITED STATES PATENTS

| | | | |
|---|---|---|---|
| 436,782 | 9/1890 | Henry | 99—79 |
| 1,006,773 | 10/1911 | Millar | 99—79 X |
| 2,220,146 | 11/1940 | Curry | 99—79 |
| 2,776,892 | 1/1957 | Sandri | 99—79 |
| 2,977,231 | 3/1961 | Fox et al. | 99—79 |

OTHER REFERENCES

Jacobs, Carbonated Beverages, 1959, pp. 28–34, 47, 207.

MORRIS O. WOLK, Primary Examiner

S. B. DAVIS, Assistant Examiner

U.S. Cl. X.R.

99—78